US012146654B1

United States Patent
Hikmet et al.

(10) Patent No.: US 12,146,654 B1
(45) Date of Patent: Nov. 19, 2024

(54) LIGHTING DEVICE, LUMINAIRE, AND METHOD MANUFACTURING

(71) Applicant: SIGNIFY HOLDING B.V., Eindhoven (NL)

(72) Inventors: Rifat Ata Mustafa Hikmet, Eindhoven (NL); Johannes Petrus Maria Ansems, Hulsel (NL); Ties Van Bommel, Horst (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/683,330

(22) PCT Filed: Aug. 2, 2022

(86) PCT No.: PCT/EP2022/071729
§ 371 (c)(1),
(2) Date: Feb. 13, 2024

(87) PCT Pub. No.: WO2023/020833
PCT Pub. Date: Feb. 23, 2023

(30) Foreign Application Priority Data

Aug. 16, 2021 (EP) ..................... 21191511

(51) Int. Cl.
*F21V 5/08* (2006.01)
*F21V 5/04* (2006.01)
(Continued)

(52) U.S. Cl.
CPC ............... *F21V 5/08* (2013.01); *F21V 5/045* (2013.01); *F21V 7/10* (2013.01); *B33Y 80/00* (2014.12)

(58) Field of Classification Search
CPC ............... F21V 5/08; F21V 5/045; F21V 7/10
See application file for complete search history.

(56) References Cited

U.S. PATENT DOCUMENTS 9,765,949 B2  9/2017 Shen et al.
2012/0126260 A1  5/2012 Hussell et al.
(Continued)

FOREIGN PATENT DOCUMENTS

WO   2018001690 A1   1/2018
WO   2019115285 A1   6/2019
(Continued)

*Primary Examiner* — Christopher E Dunay (57) ABSTRACT

The present invention generally relates to a lighting device (200) that comprises an optical component (100) for generating a beam shaping effect. The lighting device (200) further comprises a light source (201) and a light reflective component (114). The light source (201) is configured to provide a light source light and the light reflective component (114) is configured to at least partially reflect at least part of the light source light. The optical component (100) comprises a tubular body (101) having an outer surface (102), and an inner surface (103) opposite to the outer surface (102), the inner surface (102) at least in part forming a cavity (104). The tubular body (101) comprises a first end face (107) and a second end face (108) arranged opposite to the first end face (107). Furthermore, the tubular body (101) comprises a plurality of layers (109) stacked on top of each other extending in a stacking direction (110) of a longitudinal axis (001) of the optical component, each layer (109) encloses part of the cavity (104). Each of the plurality of layers (109) is a biconvex cylinder having an optical axis (002) perpendicular to the stacking direction (110). At least part of the outer surface (102) for each of the plurality of layers (109) is convex shaped and at least part of the inner surface (103) for each of the plurality of layers (109) is convex shaped. The light reflective component (114) is arranged closer to the first end face (107) compared to the second end face (108), and the light source (201) is arranged closer to the second end face (108) compared to the first end face (107).

13 Claims, 4 Drawing Sheets

(51) Int. Cl.
*F21V 7/10* (2006.01)
*B33Y 80/00* (2015.01)

(56) References Cited

U.S. PATENT DOCUMENTS

| | | | |
|---|---|---|---|
| 2018/0319076 A1 | 11/2018 | Hikmet et al. | |
| 2018/0320858 A1* | 11/2018 | Boonekamp | B33Y 80/00 |
| 2019/0277475 A1 | 9/2019 | Hikmet et al. | |
| 2020/0114572 A1* | 4/2020 | Hikmet | B33Y 10/00 |
| 2020/0408384 A1* | 12/2020 | Aruga | F21V 5/045 |
| 2022/0034482 A1* | 2/2022 | Narendran | F21V 5/04 |
| 2023/0090913 A1* | 3/2023 | Hoelen | G02B 19/0066 |
| | | | 362/551 |
| 2023/0151944 A1* | 5/2023 | Castillo | F21V 3/02 |
| | | | 385/27 |

FOREIGN PATENT DOCUMENTS

| | | |
|---|---|---|
| WO | 2021104920 A1 | 6/2021 |
| WO | 2021136716 A1 | 7/2021 |

\* cited by examiner

LIGHTING DEVICE, LUMINAIRE, AND METHOD MANUFACTURING

CROSS-REFERENCE TO PRIOR APPLICATIONS

This application is the U.S. National Phase application under 35 U.S.C. § 371 of International Application No. PCT/EP2022/071729, filed on Aug. 2, 2022, which claims the benefit of European Patent Application No. 21191511.1, filed on Aug. 16, 2021. These applications are hereby incorporated by reference herein.

FIELD OF THE INVENTION

The present invention generally relates to a lighting device that comprises an optical component for generating a beam shaping effect. The present invention further relates to a luminaire comprising the lighting device, and to a method of manufacturing the optical component.

BACKGROUND OF THE INVENTION

There is an increasing demand for light sources comprising optical components which can produce an interesting visual effect. Especially there is a demand for a relatively thin downlight luminaire realized with the optical component that can produce a batwing distribution of light. For downlight luminaires, often LED strips are used, and they are placed onto the bottom surface of a mixing chamber with high reflectivity. The light exit surface of the luminaire is covered by a light diffuser for obtaining uniform light emission. This means that for downlight luminaires of different sizes, LED strips with different lengths need to be used. Therefore, it is desirable to use a single Lambertian emitter platform such as COB LEDs which can be placed at the bottom surface of the mixing chamber in combination with the optical component that can spread light emitted by the light source sideways onto the sidewalls of the mixing chamber, reducing the central emission and send some of the light back towards the reflective back surface of the mixing chamber.

The invention disclosed in WO21136716 A1 provides a method for producing a 3D item by means of fused deposition modelling, the method comprising a 3D printing stage comprising layer-wise depositing an extrudate from 3D printable material, to provide the 3D item comprising 3D printed material, wherein the 3D item comprises a plurality of layers of 3D printed material, wherein each layer has a layer height (H) and a layer width (W), wherein the 3D printing stage comprises generating a stack of the layers of the 3D printed material (202), wherein at a fixed first x,y-position the layer height (H) is varied layer by layer for a subset of a total number of layers, wherein either (i) the layer height (H) increases for consecutive layers and then the layer height (H) decreases for consecutive layers, or (ii) the layer height (H) decreases for consecutive layers and then the layer height (H) increases for consecutive layers; and wherein at least part of the 3D printable material comprises light transmissive polymeric thermoplastic material.

SUMMARY OF THE INVENTION

There is a desire to provide a thinner downlight luminaire with Lambertian light sources, such as COB LEDs. In this respect, a smaller optical component that can produce a batwing distribution of light can be beneficial. Additionally, it is desired that this optical component can efficiently produce this desired beam shape. Finally, there is a desire to manufacture such an optical component using an easy and sustainable process.

According to a first aspect, this and other objects are achieved by a lighting device. The lighting device comprises an optical component for generating a beam shaping effect. The lighting device further comprises a light source and a light reflective component. The light source is configured to provide a light source light and the light reflective component is configured to at least partially reflect at least part of the light source light. The optical component comprises a tubular body having an outer surface, and an inner surface opposite to the outer surface, the inner surface at least in part forming a cavity. The tubular body comprises a first end face and a second end face arranged opposite to the first end face. Furthermore, the tubular body comprises a plurality of layers stacked on top of each other extending in a stacking direction of a longitudinal axis of the optical component, each layer encloses part of the cavity. Each of the plurality of layers is a biconvex cylinder having an optical axis perpendicular to the stacking direction. At least part of the outer surface for each of the plurality of layers is convex shaped and at least part of the inner surface for each of the plurality of layers is convex shaped. The light reflective component is arranged closer to the first end face compared to the second end face, and the light source is arranged closer to the second end face compared to the first end face.

In the context of the present invention, the term 'biconvex cylinder' may refer to one or more layers having a convex shaped cross-section. The term biconvex cylinder may refer to one or more layers having a round, cylindrical or oval shaped cross-section and at least a part of that that cross-section is convex shaped.

The first and second end faces may be considered as a pair of openings for facilitating the light source light to enter into the tubular body of the optical component and a part of the light source light to exit the tubular body. The light source light emitted by the light source may reach the inner surfaces of the optical body and the light reflective component.

The light source can be a Lambertian light source or emitter. For example, a COB LED. The light source light can be visible light.

The light reflective component is at least partially reflective to light source light in order to recycle light into the cavity of the optical component. The convex shaped inner and outer surface of each of the plurality of layers can provide a lensing effect for laterally spreading the light source light around the tubular body of the optical component.

The device light which exits the lighting device may have a batwing spatial light distribution.

The beam shaping effect realized by the optical component may be to produce a batwing spatial light distribution from a part of the light source light.

The cavity of the optical component may be an air cavity.

The plurality of layers may comprise a polymer that is translusive to visible light.

The plurality of layers may comprise a glass-type material that is translusive to visible light.

At least part of the tubular body may comprise a barrel shape. Especially, at least part of the tubular body may comprise a barrel shape having a maximum diameter, D that is larger than a first diameter, D1 of the first end face and a second diameter D2 of the second end face.

The first diameter, D1 may be larger than the second diameter, D2.

The ratio of the maximum diameter, D and the first diameter, D1 can be such that, 1.1<D/D1<1.5.

The ratio of the maximum diameter, D and the second diameter, D2 can be such that, 1.1<D/D2<1.5.

Each of the plurality of layers may have an elongated cross-section such that a layer width, W is greater than a layer thickness, T.

Each of the plurality of layers may comprise a layer thickness, T and a layer width, W, wherein a ratio, R=T/W of the layer thickness, T and the layer width, W is in a range from 0.4 to 0.6.

Each of the plurality of layers may comprise a radius of curvature r for the convex shaped surface. The radius of curvature may be chosen relative to a layer thickness T such that, 0.3*T<r<0.6*T and/or the ratio of the layer width W and the radius of curvature r is chosen such that, 2<W/r<4.

The light source may be at least partly arranged inside the said tubular body.

The light source may be at least partly arranged inside the said tubular body from the second end face.

Alternatively, the light source may be at least partly arranged outside of said tubular body from the second end face or at the second end face.

The light reflective component may be arranged at the first end face (or close to the first end face).

The light reflective component may be arranged above the first end face, on the first end face, or within the tubular body from the first end face of the optical component.

The light reflective component may form an integral optical part with the optical component.

The plurality of layers may comprise a plurality of successive layers that are staggered such that a diameter of the tubular body gradually increases in a direction facing away from the light source and in a direction of the first end face.

The plurality of layers may comprises a plurality of successive layers that are staggered from each other such that a first diameter, D1 of the first end face gradually increases up to a maximum diameter, D of the tubular body.

The plurality of layers may comprise a plurality of successive layers that are staggered such that a diameter of the tubular body gradually decreases in a direction facing away from the light source and in a direction of the first end face.

The plurality of layers may comprises a plurality of successive layers that are staggered from each other such that a second diameter, D2 of the second end face gradually increases up to a maximum diameter, D of the tubular body.

In the context of the present invention, the term 'staggered' may be understood as the arrangement of the plurality of successive layers where each layer may be displaced in the direction of the optical axis, in a zigzag fashion but having a partial overlap between the neighbouring layers, similar to a staircase configuration.

As the layers are displaced from each other, one may define a displacement angle between the layers from a set of the plurality of successive layers. The displacement angle may be defined by an angle between the optical axis and an imaginary line drawn at a plurality of layer edges from the plurality of successive layers, wherein the plurality of layer edges may be part of the inner surface and/or the outer surface.

A plurality of N successive layers may be staggered with respect to each other by a displacement angle that is greater than 80 degrees and less than 90 degrees. N is preferably at least 5, more preferably at least 8, most preferably at least 10. The plurality of N successive layers may be arranged in a staircase configuration. The staggered configuration may be non-linear.

A plurality of M successive layers may be staggered with respect to each other by a displacement angle that is greater than 90 degrees and less than 100 degrees. M is preferably at least 5, more preferably at least 8, most preferably at least 10. The plurality of M successive layers may be arranged in a staircase configuration. The staggered configuration may be non-linear.

A plurality of P successive layers may be staggered with respect to each other by a displacement angle that is greater than 80 degrees and less than 100 degrees between the first end face and the second end face. P is preferably at least 5, more preferably at least 8, most preferably at least 10. The plurality of P successive layers may be arranged in a double staircase configuration and having a convex shape for the part of the inner surface and the outer surface.

At least part of the tubular body may comprise a barrel shape having a maximum diameter, D and the displacement angle is equal to 90 degrees at or around the maximum diameter, D.

Below the maximum diameter, D, each of the successive layers may displaced with respect to each other by a displacement angle that is greater than 80 degrees and less than or equal to 90 degrees. From the second end face, the displacement angle gradually increases from or above 80 degrees to 90 degrees around the maximum diameter, D. Above the maximum diameter D, the displacement angle may increases from 90 degrees up to 100 degrees or less than 100 degrees. Between the first end face and the second end face, the displacement angle may change according to the following conditions: (1) 80 degrees <θ1<100 degrees, and (2) at or around the maximum diameter D, the displacement angle is equal to 90 degrees or approximately equal to 90 degrees. A set of successive layers may have a certain displacement angle, wherein this set may comprise 2 layers, 5 layers, 10 layers, or 15 layers.

The optical component may comprise an imaginary line that extends between a first edge of a first end face and an intersection point of the longitudinal axis and a second transverse plane, the second end face being arranged in the second transverse plane, and wherein the imaginary line may enclose an opening angle with the longitudinal axis that is chosen from a range between 15 degrees to 25 degrees, preferably in a range between 18 degrees to 22 degrees.

In practice, the opening angle may be chosen to be approximately 20 degrees.

The opening angle defines the preferable height of the optical component, wherein the height of the optical component is defined by the distance between the first end face and the second end face.

The light reflective component may be a first diffuser having a reflectivity of at least 40% of the light source light. The first diffuser has preferably a reflectivity of at least 50% of the light source light, more preferably at least 55%, most preferably at least 60%. The higher the reflection the more light source light emitted perpendicular to the (light output surface of the) light source is redirected. It is desired to have some light transmission. For example, in embodiments, the first diffuser may have a transmission of at least 10%, preferably at least 20%, more preferably at least 25%, most preferably at least 30%. In another embodiment, light reflective component may be non light transmissive e.g. having a very high reflection such as above 80%.

The optical component and/or the light reflective component may be made by 3D printing.

3D printing of the optical component and/or the light reflective component may offer a sustainable and easy manufacturing process. In this case, it may be preferable the optical component and/or the light reflective component may be made from thermoplastic materials that are translusive to light source light.

According to a second aspect of the present invention, a luminaire is provided comprising the lighting device described above.

The luminaire may further comprise a mixing box and the mixing box may comprise a bottom surface and a light exit surface, the bottom surface and the light exit surface being separated by the side surface, and a second diffuser arranged on, above, or below the light exit surface. The lighting device may be arranged on the bottom surface.

The bottom surface and/or the side surface may be at least partially light reflective, preferably diffusively reflective.

According to a third aspect of the present invention, a method for manufacturing the optical component is provided. The method comprises the step of 3D printing the plurality of layers with a 3D printer having an extruder nozzle.

The said 3D printing may further comprise forming of the cavity of the optical component by enclosing each layer around a part of the cavity.

With the step of the 3D printing, printed layer width, W of the plurality of layers may be the same or larger than the nozzle diameter of the extruder nozzle.

It should be understood that the interface component having a through-hole may not always receive a functional device either from a lighting tile or a ceiling tile. Also, one may assume the device facing or extending through the through-hole of the interface component may not be a functional device, yet shaped and appearing as a functional device. For example, a dummy device.

It is noted that the invention relates to all possible combinations of features recited in the claims. Other objectives, features, and advantages of the present inventive concept will appear from the following detailed disclosure, from the attached claims as well as from the drawings. A feature described in relation to one of the aspects may also be incorporated in the other aspect, and the advantage of the feature is applicable to all aspects in which it is incorporated.

BRIEF DESCRIPTION OF THE DRAWINGS

The above, as well as additional objects, features, and advantages of the disclosed devices, methods, and systems, will be better understood through the following illustrative and non-limiting detailed description of embodiments of devices, methods, and systems, with reference to the appended drawings, in which:

FIGS. 3(a) and (b) show perspective views of a luminaire comprising the lighting device, with and without a second diffuser, respectively.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
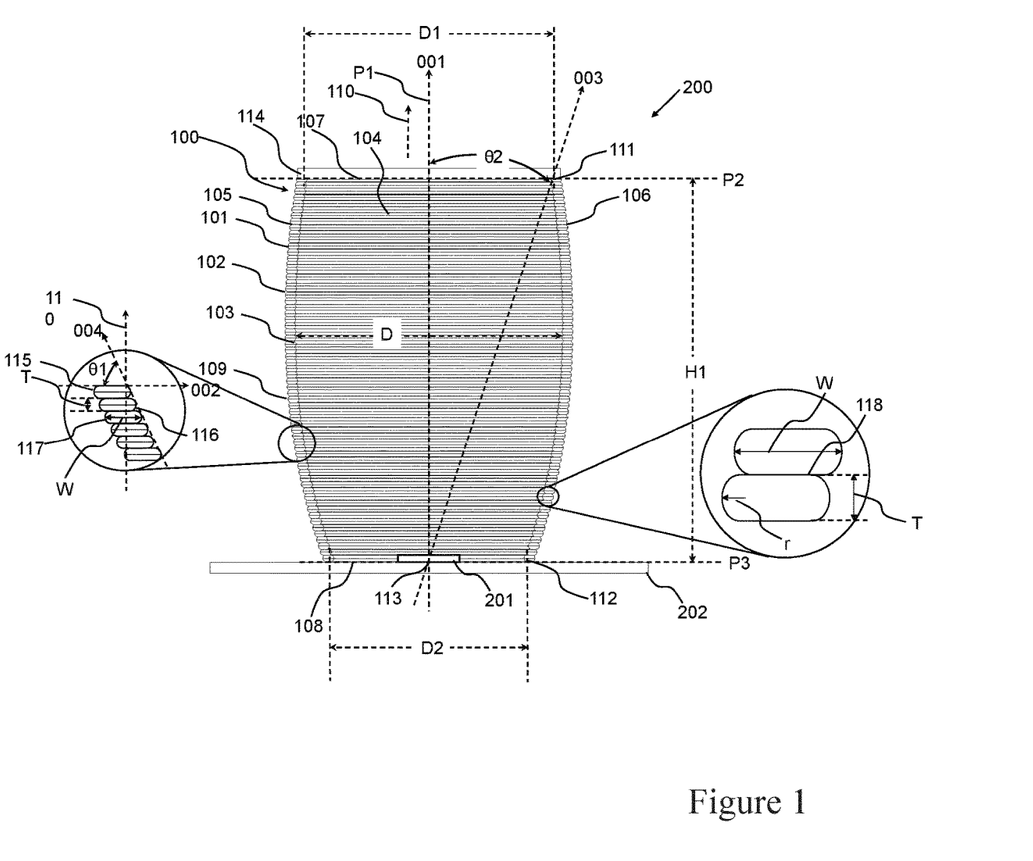
FIG. 1 shows a cross-sectional view of a lighting device.

Referring initially to FIG. 1, a cross-sectional view of a lighting device 200 is shown. The lighting device 200 comprises a light source 201 that is configured to provide a light source light. The lighting device 200 further comprises an optical component 100 that is configured for beam shaping at least part of the light source light and a light reflective component 114 that is configured to at least partially reflect at least part of the light source light.

The optical component 100 comprises a tubular body 101 having an outer surface 102 and an inner surface 103 opposite to the outer surface 102, the inner surface 103 at least in part forming a cavity 104. The tubular body 101 is arranged around a longitudinal axis 001 that is lying in a longitudinal plane P1 that separates a first part 105 and a second part 106 of the tubular body 101. The first part 105 is mirror-symmetric of the second part 106. The tubular body 101 comprises a first end face 107 and a second end face 108 that is arranged opposite to the first end face 107. The first end face 107 is arranged in a first transverse plane P2 and a second end face 108 is arranged in a second transverse plane P3 that is separated by a height H1 from the first transverse plane P2. The tubular body 101 comprises a plurality of layers 109 stacked on top of each other in a stacking direction 110 parallel to a longitudinal axis 001 of the optical component, each layer 109 encloses part of the cavity 104.

The tubular body 101 is shown to have a barrel shape having a maximum diameter D that is larger than a first diameter D1 of the first end face 107 and a second diameter D2 of the second end face 108. The first diameter D1 is larger than the second diameter D2. Preferably, $1.1 < D/D1 < 1.5$ and/or $1.1 < D/D2 < 1.5$.

In FIG. 1, a magnified inset figure is shown in the left comprising each of successive layers 115 is shown that are displaced from each other, i.e. arranged in a staggered formation such that the displacement of a plurality of successive layers 115 in the direction of the optical axis 002 can be defined a displacement angle θ1. The displacement angle θ1 may be defined by an angle between the optical axis 004 and an imaginary line 004. The imaginary line 004 is drawn at a plurality of layer edges 116 from the plurality of successive layers 115. In this case, the plurality of layer edges 116 is part of the inner surface 103 of the tubular body 101. One may use the plurality of layer edges 117 that are part of the outer surface 102 of the tubular body 101.

Below the maximum diameter D, each of the plurality of successive layers 115 is displaced with respect to each other by a displacement angle θ1 that is greater than 80 degrees and less than or equal to 90 degrees for the first part 105. From the second end face 108, the displacement angle θ1 gradually increases from or above 80 degrees to 90 degrees around the maximum diameter D. Above the maximum diameter D, the displacement angle θ1 angle increases from 90 degrees up to 100 degrees or less than 100 degrees. For the second part 106, the displacement angle θ1 changes similarly. Hence, between the first end face 107 and the second end face 108, the displacement angle θ1 may change according to the following conditions: (1) 80 degrees<θ1<100 degrees, and (2) at or around the maximum diameter D, θ1=90 degrees or θ1 approximately equal to 90 degrees. A set of successive layers 115 may have a certain displacement angle θ1, wherein this set may comprise 2 layers, 5 layers, 10 layers, or 15 layers.

The light reflective component 114 is arranged closer to the first end face 107 compared to the second end face 108. In FIG. 1, the light reflective component 114 is arranged at the first end face 107, on the first transverse plane P2. In practice, the light reflective component may be located below or above the first transverse plane. The light reflective component 114 may be partly reflective or completely reflective to the light source light. The light reflective component 114 may be a first diffuser having a reflectivity of at least 40% of the light source light. The light reflective component 114 may be arranged at the first end face 107 and forming an integral optical part with the optical component 100.

The light source 201 is arranged on a substrate 202 closer to the second end face 108 compared to the first end face 107. The light source 201 may be a Lambertian light source, for example, COB LED. The light source 201 may be configured to emit visible light. In FIG. 1, the light source 201 is arranged in the second transverse plane P3, inside said tubular body 101 from the second transverse plane P3. However, the light source 201 may be also arranged outside of the tubular body 101, below the second transverse plane P2. The light source 201 is configured to emit light source light towards the optical component 100 and the light reflective component 114.

In the magnified inset figure shown in the left, each of the plurality of layers 109 is shown to be partly elongated such that layer width W is greater than the layer thickness T. Each of the plurality of layers 109 comprises a layer thickness T and a layer width W, wherein a ratio R (=T/W) of the layer thickness T and the layer width W is in a range from 0.4 to 0.6.

In the magnified inset figure is shown in the right, each layer 109 cross-section is shown to be a biconvex cylinder having an optical axis 002 perpendicular to the stacking direction 110. The optical axis 002 is also perpendicular to the longitudinal axis 001. The part of the outer surface 102 for each of the plurality of layers 109 is convex shaped and the part of the inner surface 103 for each of the plurality of layers 109 is convex shaped. The stacking surface 118 is flat. The radius of curvature r for the convex surface may be chosen such that, 0.3*T<r<0.6*T and/or the ratio of the layer width W and radius of curvature r is chosen such that, 2<W/r<4. Individual layers having convex shape offer a lens effect for the part of the light source light that is impinging on the inner surface 103 of the optical component 100. The lens effect, in this case, can be the spreading of the light source light in a lateral direction.

The optical component 100 comprises an imaginary line 003 as shown in FIG. 1. The imaginary line 003 extends between a first edge 111 of a first end face 107 and an intersection point 113 of the longitudinal axis 001 and a second transverse plane P3, the second end face 108 being arranged in the second transverse plane P3. The imaginary line 003 encloses an opening angle θ2 with the longitudinal axis 001 that is chosen from a range between 15 degrees to 25 degrees, preferably between 18 degrees to 22 degrees. In practice, the opening angle θ2 can be approximately 20 degrees.

Figure 2:
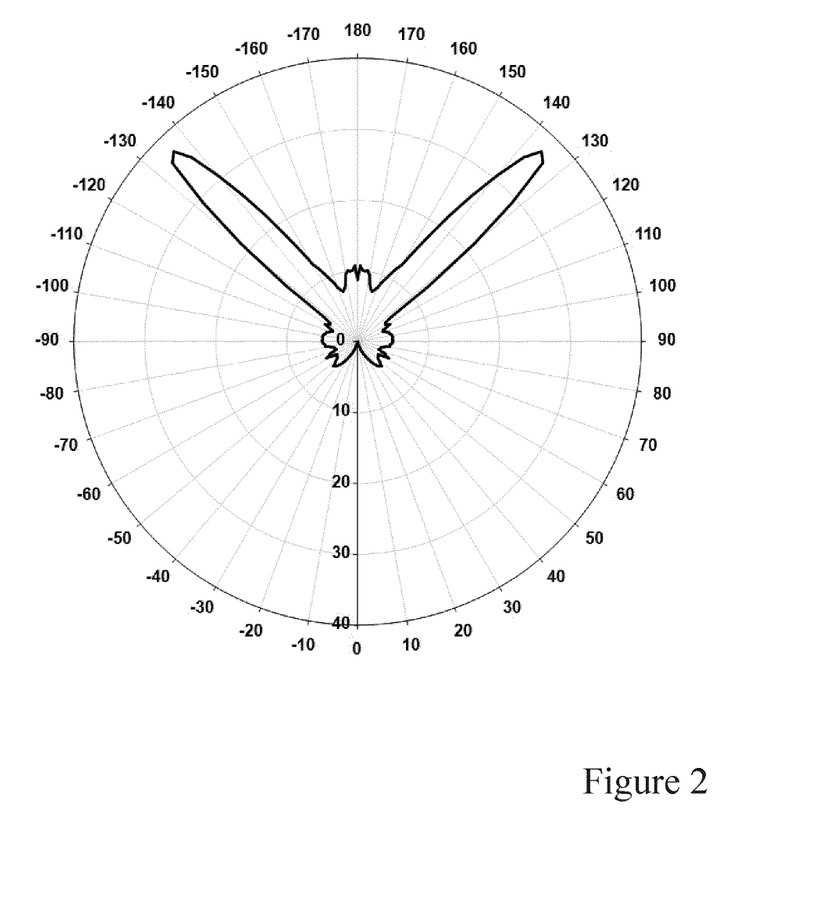
FIG. 2 shows a luminous intensity distribution plot for the lighting device.

FIG. 2 shows a luminous intensity distribution plot for the lighting device 200 when the lighting device 200 is arranged as described above. The device light is shown to have a batwing spatial light distribution with two prominent side lobes and a central lobe indicating a central intensity distribution. The luminous intensity distribution plot shown in FIG. 2 is a simulation result.

FIGS. 3(a) and (b) show perspective views of a luminaire 300 comprising the lighting device 200. According to FIG. 3(a), the luminaire 300 comprises a mixing chamber 301. The mixing chamber 301 comprises a bottom surface 302 and a light exit surface 303. The light exit surface 303 is depicted to be an open surface in FIG. 3(a). The bottom surface 302 and the light exit surface 303 are separated by the side surface 304. The height of the mixing chamber 301 is depicted to be H2. In FIG. 3(b), a second diffuser 305 is arranged on or above the light exit surface 303. The bottom surface 302 and/or the side surfaces 303 can be light reflective or diffusively reflective such that the batwings hit the side surface 304 of the mixing chamber 301 while the reflectivity of the second diffuser 305 is adjusted to obtain uniform light distribution from the exit surface of the luminaire 300. The second diffuser 305 can be a scattering diffuser. The lighting device 200 is arranged in a central bottom surface 302 of the mixing chamber 301.

Figure 3:
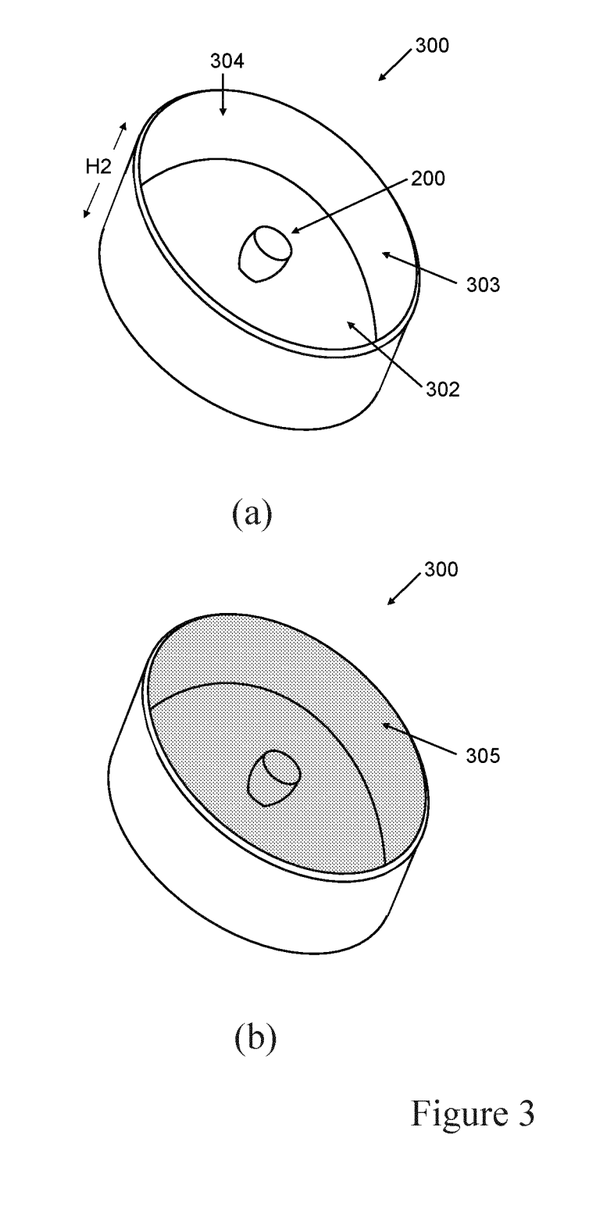
Figure 4:
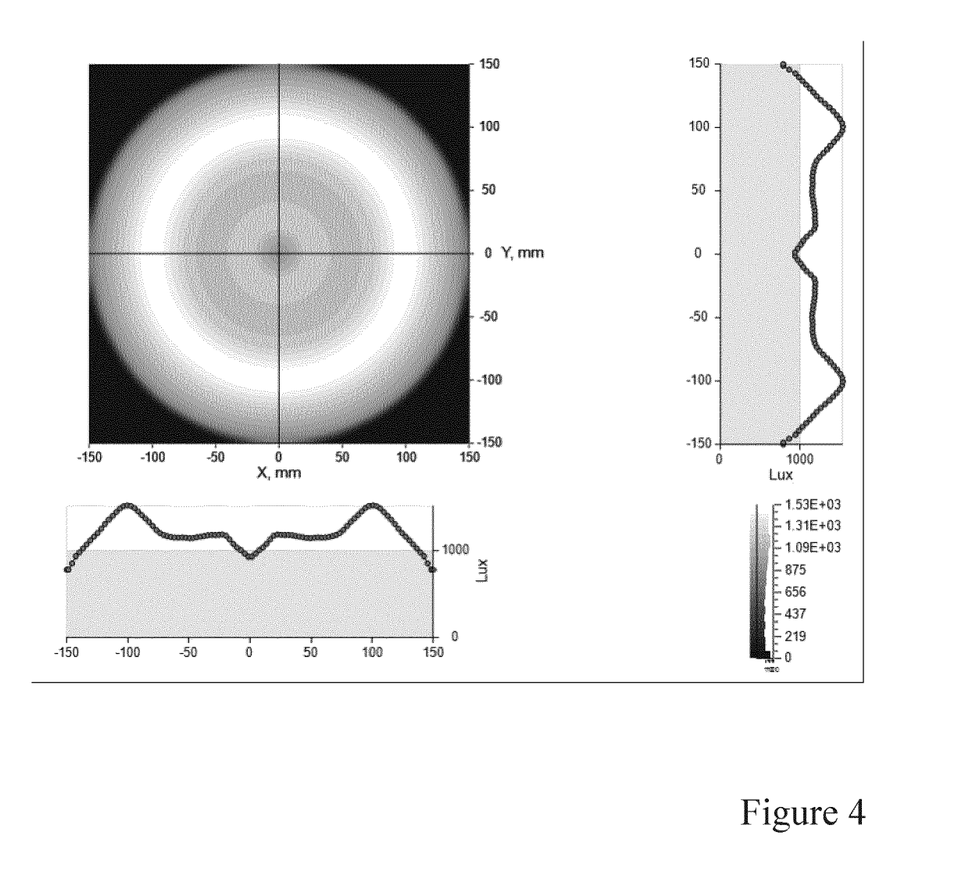
FIG. 4 shows a simulation of the illumination (lux) plot of the luminaire as shown in FIG. 3.

FIG. 4 shows the simulation of the illumination (lux) plot of the luminaire 300 as shown in FIG. 3. In the simulation, the mixing chamber 301 has a 300 mm diameter. The side surface 304 has a 97% diffusely reflecting surface. The height of the mixing chamber, H2 is 120 mm. The light source of the lighting device 200 as shown in FIG. 3 is a COB LED emitting 100 lumen. This simulation shows that the vertical and horizontal illumination distribution 1 mm above the second diffuser 305 can be fairly uniform.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The mere fact that certain features are recited in mutually different dependent claims does not indicate that a combination of these features cannot be used to advantage. The various aspects discussed above may be combined in order to provide additional advantages. Further, the person skilled in the art will understand that two or more embodiments may be combined.

The invention claimed is:

1. A lighting device for providing a device light, the lighting device comprising,
   a light source configured to provide a light source light;
   an optical component configured for beam shaping at least part of the light source light; and
   a light reflective component configured to at least partially reflect at least part of the light source light;
   wherein the optical component comprises a tubular body having an outer surface, and an inner surface opposite to the outer surface, the inner surface at least in part forming a cavity, wherein the tubular body comprises a first end face and a second end face that is arranged opposite to the first end face, wherein the tubular body comprises a plurality of layers stacked on top of each other extending in a stacking direction of a longitudinal axis of the optical component, each layer encloses part of the cavity, wherein each of the plurality of layers is a biconvex cylinder having an optical axis perpendicular to the stacking direction, wherein at least part of the outer surface for each of the plurality of layers is convex shaped and at least part of the inner surface for each of the plurality of layers is convex shaped, and wherein the light reflective component is arranged closer to the first end face compared to the second end face, and the light source is arranged closer to the second end face compared to the first end face, and wherein the device light has a batwing spatial light distribution.

2. The lighting device according to claim 1, wherein at least part of the tubular body comprises a barrel shape having a maximum diameter that is larger than a first diameter of the first end face and a second diameter of the second end face.

3. The lighting device according to claim 2, wherein the first diameter is larger than the second diameter.

4. The lighting device according to claim 2, wherein $1.1<D/D1<1.5$ and/or $1.1<D/D2<1.5$.

5. The lighting device according to claim 1, wherein each of the plurality of layers comprises a layer thickness and a layer width, wherein a ratio of the layer thickness and the layer width is in a range from 0.4 to 0.6.

6. The lighting device according to claim 1, wherein the light source is at least partly arranged inside the said tubular body.

7. The lighting device according to claim 1, wherein the light reflective component is arranged at the first end face and forms an integral optical part with the optical component.

8. The lighting device according to claim 1, wherein the plurality of layers comprises a plurality of successive layers that are staggered such that a diameter of the tubular body gradually increases in a direction facing away from the light source in a direction of the first end face.

9. The lighting device according to claim 1, wherein the plurality of layers comprises a plurality of successive layers that are staggered such that a diameter of the tubular body gradually decreases in a direction facing away from the light source and in a direction of the first end face.

10. The lighting device according to claim 1, wherein the optical component comprises an imaginary line that extends between a first edge of a first end face and an intersection point of the longitudinal axis and a second transverse plane, the second end face being arranged in the second transverse plane, and wherein the imaginary line encloses an opening angle with the longitudinal axis that is chosen from a range between 15 degrees to 25 degrees.

11. The lighting device according to claim 1, wherein the light reflective component is a first diffuser having a reflectivity of at least 40% of the light source light.

12. The lighting device according to claim 1, wherein the optical component and/or the light reflective component is made by 3D printing.

13. A luminaire comprising the lighting device according to claim 1.

* * * * *